US012769894B2

(12) United States Patent
Swierkot et al.

(10) Patent No.: US 12,769,894 B2
(45) Date of Patent: Oct. 20, 2026

(54) METHOD FOR DIVIDING A LATTICE STRUCTURE IN A CELL-CONFORMING MANNER

(71) Applicant: OECHSLER AG, Ansbach (DE)

(72) Inventors: Adrian Swierkot, Ansbach (DE); Joachim Sturm, Sachsen bei Ansbach (DE); Markus Christ, Nuremberg (DE)

(73) Assignee: Oechsler AG, Ansbach (DE)

( * ) Notice: Subject to any disclaimer, the term of this patent is extended or adjusted under 35 U.S.C. 154(b) by 1165 days.

(21) Appl. No.: 17/726,606

(22) Filed: Apr. 22, 2022

(65) Prior Publication Data

US 2022/0343035 A1 Oct. 27, 2022

(30) Foreign Application Priority Data

Apr. 26, 2021 (DE) ..................... 10 2021 110 650.8

(51) Int. Cl.
*G06F 30/10* (2020.01)
*B29C 64/153* (2017.01)
(Continued)

(52) U.S. Cl.
CPC ............ *G06F 30/10* (2020.01); *B29C 64/153* (2017.08); *B29C 64/307* (2017.08); *G06F 30/27* (2020.01);
(Continued)

(58) Field of Classification Search
CPC ...... G06F 30/10; G06F 30/27; G06F 2113/10; G06F 30/13; B29C 64/153; B29C 64/307;
(Continued)

(56) References Cited

U.S. PATENT DOCUMENTS 8,412,588 B1 * 4/2013 Bodell ............... G06Q 30/0643 706/919
2005/0173839 A1 * 8/2005 Crump ................ B29C 33/3842 264/401
(Continued)

FOREIGN PATENT DOCUMENTS

CN 103247076 A 8/2013
CN 111145356 A 5/2020
(Continued)

OTHER PUBLICATIONS

Duan, Li, et al. "Automatic three-dimensional-scanned garment fitting based on virtual tailoring and geometric sewing." Journal of Engineered Fibers and Fabrics 14 (2019): 1558925018825319 (Year: 2019).*

(Continued)

*Primary Examiner* — Saif A Alhija
(74) *Attorney, Agent, or Firm* — Buchanan Ingersoll & Rooney PC

(57) ABSTRACT

A computer-implemented method for dividing a virtual three-dimensional overall model of a body into at least two virtual partial models, includes:

Figure 1:
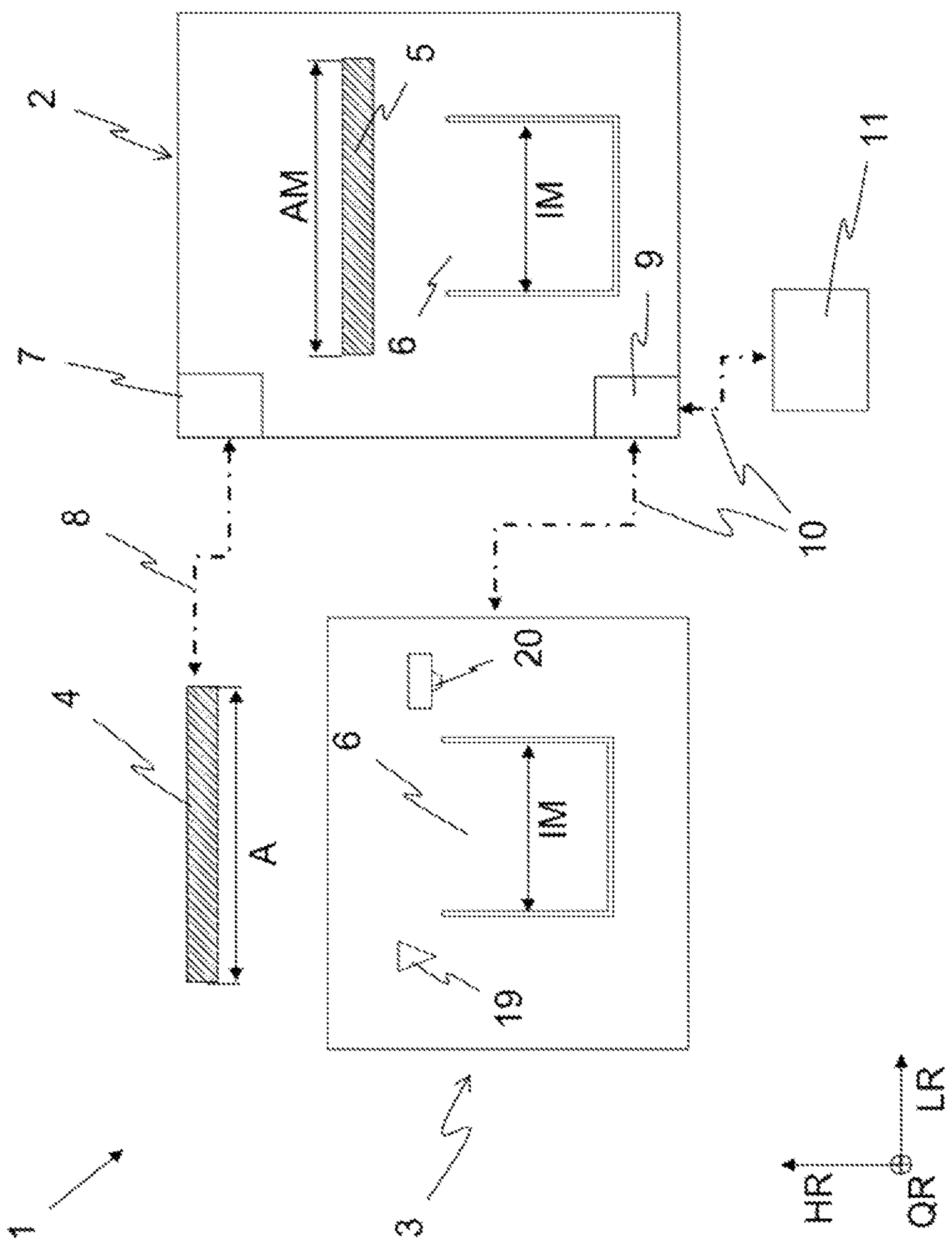

Creating a virtual separating surface for the overall model of the body, which has a three-dimensional cell-conforming shape;

Creating the overall model of the body with a lattice structure formed from a plurality of cells; and Dividing the overall model along the cell-conforming separating surface into two partial models, so that when the overall model is divided, common struts of the lattice structure, which are each part of at least one cell of one partial model and part of at least one adjacent cell of the other partial model are divided by (Continued)

means of the cell-conforming separating surface in such a way that the corresponding cells remain closed.

13 Claims, 10 Drawing Sheets

(51) Int. Cl.

| | |
|---|---|
| ***B29C 64/307*** | (2017.01) |
| ***B33Y 10/00*** | (2015.01) |
| ***B33Y 50/02*** | (2015.01) |
| ***G06F 30/27*** | (2020.01) |
| ***G06F 113/10*** | (2020.01) |

(52) U.S. Cl.
CPC ............... *B33Y 10/00* (2014.12); *B33Y 50/02* (2014.12); *G06F 2113/10* (2020.01)

(58) Field of Classification Search
CPC .......... B29C 65/4895; B29C 66/00143; B29C 66/1142; B29C 66/1162; B29C 66/1248; B29C 66/14; B29C 66/223; B29C 66/229; B29C 66/5261; B29C 66/71; B29C 66/7252; B29C 66/727; B29C 66/73921; B29C 66/8324; B29C 64/393; B33Y 10/00; B33Y 50/02; B33Y 50/00; Y02P 10/25; B22F 10/80; G06T 17/20; G06Q 50/04
See application file for complete search history.

(56) References Cited

U.S. PATENT DOCUMENTS

| | | | | |
|---|---|---|---|---|
| 2009/0068376 | A1 | 3/2009 | Philippi et al. | |
| 2011/0087350 | A1 * | 4/2011 | Fogel ...................... | G06T 19/00 700/98 |
| 2014/0052415 | A1 | 2/2014 | Baran et al. | |
| 2018/0276316 | A1 | 9/2018 | Brochu et al. | |

FOREIGN PATENT DOCUMENTS

| | | | |
|---|---|---|---|
| KR | 10-2016-0100721 | A | 8/2016 |
| TW | 201250509 | A | 12/2012 |
| WO | 2006122645 | A1 | 11/2006 |
| WO | 2021/073719 | A1 | 4/2021 |

OTHER PUBLICATIONS

Kim, Sohyun, et al. "A study of the development and improvement of fashion products using a FDM type 3D printer." Fashion and Textiles 6.1 (2019): 9 (Year: 2019).*

Lu, Bingheng, Dichen Li, and Xiaoyong Tian. "Development trends in additive manufacturing and 3D printing." Engineering 1.1 ( 2015): 085-089. (Year: 2015).*

Baek, Adrian Matias Chung. Non-Periodic Lattice Structure Design for Additive Manufacturing. Diss. Ulsan National Institute of Science and Technology (UNIST), 2020. (Year: 2020).*

Wang, Zhiping, et al. "Stiffness modulation for soft robot joint via lattice structure configuration design." Procedia CIRP 100 (2021): 732-737. (Year: 2021).*

European Search Report issued Oct. 5, 2022, by the European Patent Office in corresponding European Patent Application No. 22170071.9-1207. (10 pages).

Office Action (First Review Notice of Observations) issued on Mar. 21, 2025, in corresponding Chinese Patent Application No. 202210422110.1 and English translation of the Office Action. (14 pages).

Office Action issued in Taiwanese Patent Application No. 111115730, dated Mar. 14, 2023 (4 pages).

Lou, L., et al., "Chopper: Partitioning Models into 3D-Printable Parts", ACM Transactions on Graphics, Nov. 2012, vol. 31, No. 6, Article 129 (9 pages).

Medellín, H., et al., "Automatic Subdivision and Refinement of Large Components for Rapid Prototyping Production", ASME IDETC/CIE, 2005 (22 pages).

Oh, Y., et al., "Part decomposition and assembly-based (Re) design for additive manufacturing: A review", Additive Manufacturing, 2018, vol. 22, pp. 230-242.

Vanek, J., et al., "PackMerger: A 3D Print vol. Optimizer", Computer Graphics Forum, 2014, vol. 33, No. 6, pp. 322-332.

Zhou, Y., et al., "Boxelization: Folding 3D Objects into Boxes", ACM Transactions on Graphics, Jul. 2014, vol. 33, No. 4. (8 pages).

* cited by examiner

METHOD FOR DIVIDING A LATTICE STRUCTURE IN A CELL-CONFORMING MANNER

FIELD

The present invention relates to a method, in particular a computer-implemented method, for dividing a virtual three-dimensional overall model of a body into at least two virtual partial models.

BACKGROUND

Devices and methods for producing a three-dimensional object are widely known in the prior art. WO 2006/122645 A, for example, discloses a device and a method for producing a three-dimensional object by solidifying layers of a powdery material. The layers are applied to the surface of a working panel by means of a coater.

Such methods generally have the disadvantage that the working panel is limited and therefore only bodies with a limited size can be produced. In order to avoid this disadvantage, it is known to subdivide larger bodies into smaller partial bodies that are printed individually and joined together later. This division weakens the lattice structures. This can adversely affect the mechanical properties of the body to be printed. Furthermore, inaccuracies can arise in the partial bodies during the subsequent joining, so that they cannot be joined together in the best possible manner. In addition, the joining process is usually time-consuming and/or cost-intensive.

SUMMARY

The object of the present invention is to eliminate the disadvantages known from the prior art.

The object on which the invention is based is achieved by the features of the independent claims. Further advantageous configurations result from the dependent claims and the drawings.

A method, in particular a computer-implemented method, is proposed for dividing a virtual three-dimensional overall model of a body into at least two virtual partial models. In the process, a virtual three-dimensional separating surface is created for the overall model of the body, which has a three-dimensional cell-conforming shape. The term “cell-conforming” refers to a shape that follows the geometry, shape, exterior surface, and/or contour of unit cells. In the method, the overall model of the body is created with a lattice structure made up of a large number of cells. In this case, the unit cells are preferably replaced by the lattice structure. The overall model is then divided into two partial models along the cell-conforming cut surface. The division takes place in such a way that common struts of the lattice structure, which are both part of at least one cell of one partial model and part of at least one adjacent cell of the other partial model, are divided by means of the cell-conforming separating surface in such a way that the corresponding cells remain whole and/or closed. The cells are therefore not broken up. Instead, all of their struts remain. The partial models thus each have self-contained lattice structures. A very high degree of stability of the partial models and of the overall model can advantageously be achieved in this way. The partial models as well as the overall model can also be formed very easily by this cell-conforming division, since no increased accumulation of material is necessary in the joining area between the two partial models. In addition, surfaces that correspond to one another are created so that the partial models can be precisely positioned and guided with respect to one another.

It is advantageous if the common struts are divided in their respective longitudinal direction. This can ensure that the cells are not broken up, but instead remain whole and/or closed. Advantageously, however, a very high level of stability can be achieved.

It is also advantageous if the common struts are divided in such a way that the parts of the respective common strut each extend without gaps and/or continuously between two nodes of the respective corresponding cell. However, the respective adjacent cells remain whole and/or closed.

Furthermore, it is advantageous if at least one of the common struts is divided in such a way that the respective parts are symmetrical or asymmetrical to one another.

In an advantageous development of the invention, it is advantageous if a three-dimensional virtual base body is provided before the creation of the separating surface. Said body reflects the geometric dimensions of the overall model to be created. In this regard, it is also advantageous if at least one cut surface, in particular a flat, curved and/or kinked surface, is then defined, which divides the base body. It is also advantageous if, in particular, a volume of the base body is subsequently filled with a plurality of whole unit cells. The unit cells essentially include a surface, edges, and a center point.

It is advantageous if the three-dimensional cell-conforming shape of the separating surface is created by an algorithm and/or by means of a cell surface of at least some of the whole unit cells located in the region of the cut surface. As a result, the shape of the separating surface is essentially modeled on the surface of the unit cells adjacent to the cut surface.

In an advantageous development of the invention, at least the whole unit cells located in the region of the cut surface are assigned to one of the two sides of the cut surface in order to create the three-dimensional cell-conforming shape of the separating surface. Each of the two sides of the cut surface is therefore advantageously assigned to a respective unit cell group which has a three-dimensional cell-conforming abutment surface in the region of the cut surface.

It is advantageous if the whole unit cells are assigned to one of the two sides of the cut surface via their center point. Accordingly, the whole unit cells are preferably assigned to the side of the cut surface on which their center point is located.

It is particularly advantageous if the shape of the separating surface is created correspondingly and/or based on the three-dimensional cell-conforming, abutting surface of one of the two unit cell groups, so that the separating surface preferably has a shape that corresponds to the cell surface of the unit cells forming the abutting surface. When creating the lattice structure, it is advantageous if the unit cells are intersected with an exterior surface of the base body, in particular to form a surface lattice structure.

To create the lattice structure of the overall model, it is advantageous if the unit cells are replaced with struts that extend along the edges of the unit cells. The struts represent bodies with a volume in this regard. These struts can now be divided in a cell-conforming manner, so that the corresponding cells remain whole and/or closed. All struts of a cell thus continue to extend continuously and/or uninterruptedly between the nodal points of the cell.

In an advantageous development of the invention, the method has at least one of the following steps:

- Matching at least one external dimension of the virtual three-dimensional overall model of the body with at least one corresponding internal dimension of a limited production area of an additive production device in at least one spatial direction;
- Dividing the overall model into the at least two virtual three-dimensional partial models when the external dimension of the overall model exceeds the corresponding internal dimensions of the production area;
- Forming at least one connecting element, which connects the at least two partial models to one another in such a movable manner that they can be moved relative to one another from a production position in which corresponding joining surfaces of the partial models are spaced apart from one another to a joining position in which the corresponding joining surfaces of the partial models abut one another; and/or
- Creating a virtual three-dimensional production model in the production position of the partial models. The production model is essentially the overall model, which has been divided into at least two partial models and whose partial models are connected to one another via at least one connecting element and are located relative to one another in the production position.

It is advantageous if at least one of the above method steps is carried out by a user with a computing unit, in particular a computer program stored thereon and/or artificial intelligence, and/or is carried out by such a computing unit.

Also proposed is a computing unit for dividing a virtual three-dimensional overall model of a body into at least two virtual partial models, in particular by means of a computer program stored thereon and/or artificial intelligence. The arithmetic unit is designed to carry out at least some of the method steps of a method according to the preceding description. It is possible for the features mentioned to be present individually or in any combination.

Also proposed is a computer program and/or artificial intelligence which, when executed by a computing unit, causes said computing unit to carry out at least some of the method steps of a method for dividing a virtual three-dimensional overall model of a body into at least two virtual partial models in accordance with the preceding description. The features mentioned can be present individually or in any combination.

Also proposed is a computer-readable storage medium with an at least partially stored virtual three-dimensional overall model of a body, which is divided into at least two virtual partial models, which was produced by using a method, a computing unit, a computer program and/or artificial intelligence as described above. The features mentioned can be present individually or in any combination.

What is proposed is a production method for producing a body in which a virtual three-dimensional overall model of the body, which is divided into at least two virtual partial models, and/or a virtual three-dimensional production model in the production position of the partial models is produced by using a method according to the preceding description. The features mentioned can be present individually or in any combination. Production data for an additive production device is then created by using the divided, virtual, three-dimensional overall model and/or production model. Finally, using the additive production device, the body is produced on the basis of the production data. The additive production device is preferably a 3D printer.

It is advantageous if partial bodies are produced on the basis of the partial models, wherein at least one of the partial bodies is produced in an additive production process, wherein the at least two partial bodies are exposed to a solvent atmosphere in a chamber, so that a surface of the partial bodies is smoothed, and that the at least two partial bodies are placed into the chamber in such a way that they touch at least one joining surface and the solvent atmosphere thus forms a material connection between the at least two partial bodies on the at least one joining surface.

A body is proposed which is produced by using a production method in accordance with the preceding description. It is possible for the features mentioned to be present individually or in any combination.

Furthermore, a device with a computing unit is proposed for creating a virtual three-dimensional overall model of a body, and/or using an additive production device to produce the body. The computing unit is designed to carry out at least some of the method steps of a method for creating a virtual three-dimensional overall model of the body according to the preceding description. It is possible for the features mentioned to be present individually or in any combination.

In addition or as an alternative to the above devices and methods, the following methods and devices are proposed, which can be combined with the above devices and/or methods as desired. A method, in particular a computer-implemented method, is proposed for creating a virtual three-dimensional production model of a body. A virtual three-dimensional production model is to be understood as a model that is used for the creation and/or production of the body, in particular by a device with an additive production device.

In the method, at least one external dimension of a virtual three-dimensional overall model of the body is compared to at least one corresponding internal dimension of a limited production area of an additive production device in at least one spatial direction. The virtual three-dimensional overall model can be a CAD model, for example. The overall model represents the virtual image of the body to be produced. The overall model of the body can be created manually by a user and/or determined automatically by a computing unit.

The production area is the region in which the body can then be at least partially produced. The respective internal dimension of the production area in each spatial direction limits the maximum external dimension of the overall model that can be produced in this spatial direction. Each of the external dimensions of the virtual three-dimensional overall model of the body is preferably compared with each of the corresponding internal dimensions of the limited production area of the additive production device in the respective spatial directions, i.e., in the longitudinal, transverse and vertical directions. This ensures that the body can be produced in the limited production area.

If the external dimensions of the overall model exceed the corresponding internal dimensions of the production area, the overall model is divided into at least two virtual three-dimensional partial models. This division can take place according to a method and/or a device according to the preceding description. It is possible for the features mentioned to be present individually or in any combination. At least one connecting element is then formed, which connects the at least two partial models with one another in such a movable manner that they can be moved relative to one another from a production position in which corresponding joining surfaces of the partial models are spaced apart from one another or a joining position in which the corresponding joining surfaces of the partial models abut one another.

The production position is to be understood as the position in which the at least two partial models can, together with their connecting connection element, be placed within the production area and be produced with the aid of the production device. The partial models are virtual three-dimensional models of parts of the body. On the other hand, the joining position is to be understood as the position in which the at least two partial models abut one another by means of the joining surfaces in such a way that they form the at least one external dimension of the overall model. In this case, the joining surfaces are the surfaces that produce the connection between the at least two partial models in the joining position.

The virtual three-dimensional production model is then created in the production position of the partial models. The virtual three-dimensional production model of the partial models can be used for subsequent additive production within the limited production area of the additive production device. The production model of the body advantageously comprises the overall model and the connecting element in the joining position.

The method has the advantage that the overall model can be produced within the limited production area, although at least one of the external dimensions protrudes beyond the corresponding internal dimension of the limited production area. The overall model is therefore too large for the production area in at least one of the spatial directions. The connecting element connects the at least two partial models so that they can be printed independently of one another in the production position and moved into the joining position after production. This means that overall models or bodies that exceed the limited production area can be produced as well.

The at least one connecting element can also ensure that the joining surfaces of the respective partial models abut one another in the joining position. The respective partial models are produced together, in particular one after the other and/or one above the other, in the production area. The partial models are connected to one another by means of the at least one connecting element in such a way that even if the production parameters change, for example if there are temperature fluctuations, they can be produced to correspond to one another or be dimensionally stable.

It is advantageous if the connecting element is designed in such a way that it connects the at least two partial models to one another in such a way that they are rotatably or translationally movable, in particular that they can be folded and/or displaced relative to one another, wherein the connecting element is preferably designed as a connecting joint, in particular a rotary joint and/or sliding joint. The at least two partial models can be folded and/or displaced from the production position to the joining position and/or vice versa. The connecting joint thus creates a simple and functional connection between the at least two partial models. The connecting element can be designed as a joint, for example as a separable and/or as an inseparable hinge. If the hinge is designed to be separable, then each of the partial models comprises a hinge section which are separably connected to one another. If the hinge is designed to be inseparable, it can be arranged, for example, as a film hinge as a thin region between the at least two partial models. If the connecting element is produced together with the partial models, it can be made of the same and/or a different material than the partial models.

Furthermore, it is advantageous if at least one locking element is formed, by means of which two corresponding partial models can be locked in relation to one another in their joining position. The at least one locking element can thus prevent the at least two corresponding partial models from being moved from the joining position back to the production position. In addition, with the aid of the locking element and the associated holding of the partial models in the joining position of the at least two corresponding partial models, the joining of parts of the body to form the body subsequent to the production can be facilitated.

It is also advantageous if at least one external dimension of at least one of the partial models and/or the production model in the production position is compared with the at least one corresponding internal dimension of the limited production area in at least one of the spatial directions. It can thereby be ensured that the at least one partial model in the production position and/or the production model is arranged in particular exclusively within the delimited production area and can therefore be produced.

The at least one partial model is then advantageously divided into at least two partial models or sub-partial models if the external dimensions of the adjusted partial model and/or the production model exceed the corresponding internal dimensions of the production area. At least one connecting element and/or locking element can then be formed between the at least two sub-partial models and/or the virtual production model can be created in the production position of the partial models and sub-partial models. Thus, if the external dimension is exceeded, at least one of the partial models can be further divided by the at least one corresponding internal dimension of the limited production area. The at least one connecting element arranged on the sub-partial models ensures that the at least two sub-partial models are moved from the production position to the joining position and/or vice versa.

In an advantageous development, the overall model, the partial model and/or the sub-partial model is divided in such a way that its external dimensions are smaller than the corresponding internal dimensions of the production area. This ensures that the production model can be produced within the limited production area. In addition, an unnecessary further division of the overall model, the partial model and/or the sub-partial model can be avoided if its external dimensions are already smaller than the corresponding internal dimensions of the production area.

Furthermore, it is advantageous if the at least one external dimension of the virtual three-dimensional overall model of the body, the at least one partial model and/or the production model is recorded in at least one spatial direction. In addition, it is advantageous if the at least one internal dimension of the delimited production area of the additive production device is entered and/or determined in at least one spatial direction. At least one of the aforementioned steps of detecting the external dimensions, entering and/or determining the internal dimensions can be performed manually by a user and/or determined automatically by a computing unit. This ensures that the at least one external dimension and/or internal dimension is available for carrying out the method.

In addition, it is advantageous if at least some of the method steps, in particular the adjustment and the division, are carried out iteratively until the production model fits completely into the production area. It can thus be ensured that the production model can be produced with the production device following the iterative method. The iterative method represents a very simple way of making the production model manufacturable.

Advantageously, after the at least one external dimension has been compared with the at least one internal dimension and/or before the division into at least two partial models and/or sub-partial models, at least two of the external dimensions of the overall model and/or the partial model are exchanged with at least two of the internal dimensions of the production area. By exchanging at least two of the external dimensions with at least two of the internal dimensions, the overall model and/or the partial model is rotated in the production area. If at least one additional external dimension of the overall model exceeds a corresponding additional internal dimension of the production area in one of the spatial directions, at least one method step, in particular the comparison and the division, can be eliminated due to the exchange. Additionally or alternatively, the exchange, in particular together with the adjustment and/or the division, can be carried out iteratively until the production model fits completely into the production area.

Furthermore, it is advantageous if, after the at least one external dimension has been compared to the at least one internal dimension and before the division into at least two partial models and/or sub-partial models, at least one external dimension of the production model resulting from the division is compared to the internal dimension of the production area. When the connecting element is divided and then formed, at least one of the external dimensions is reduced in one of the spatial directions, as a result of which another external dimension is increased in another spatial direction. By comparing the resulting external dimensions of the production model to the internal dimensions of the production area, it can thus be estimated before the division whether all external dimensions fit into the internal dimensions and whether the production model can therefore be produced in the production device. As a resuit, unnecessary process steps can be avoided.

Furthermore, it is advantageous if at least one of the method steps is carried out by a user with a computing unit, in particular a computer program stored thereon and/or an artificial intelligence, and/or by such a computing unit. In addition or as an alternative to the iterative process described above, the production model can be designed to be manufacturable quickly and/or with as few method steps as possible with the aid of artificial intelligence. Artificial intelligence can intervene in the course of the method in such a way that as few method steps as possible are used and/or the method steps are carried out with the least effort. In addition, an unnecessary division of the overall model, the partial model and/or the sub-part model can be avoided.

What is also proposed is a computing unit for creating a virtual three-dimensional production model of a body, in particular with a computer program and/or artificial intelligence stored thereon. The computing unit is designed to carry out at least some of the method steps of a method for creating a virtual three-dimensional production model of a body according to the preceding description. It is possible for the features mentioned to be present individually or in any combination. The computing unit can comprise an input interface for detecting, inputting and/or determining the at least one external dimension and/or internal dimension. Thus, data, in particular geometrical data of the body and/or the production device, can be entered into the computing unit from external input devices and/or by a user. Additionally or alternatively, the processing unit can have an output interface for outputting the production data to a production device and/or to a computer-readable storage medium.

What is also proposed is a computer program and/or artificial intelligence which, when executed by a computing unit, causes said program or artificial intelligence to carry out at least some of the method steps of a method for creating a virtual three-dimensional production model of a body according to the preceding description. The features mentioned can be present individually or in any combination.

What is also proposed is a computer-readable storage medium, in particular a data memory with a virtual three-dimensional production model stored on it, which was produced by using a method, a computing unit, a computer program and/or artificial intelligence according to the preceding description. The features mentioned can be present individually or in any combination. A computer-readable storage medium is to be understood in this regard as a medium that stores the production model and/or can be read in a device described below. The computer-readable storage medium can be a flash memory, a hard disk, a cloud and/or an optical memory, for example.

A production method for producing a body is proposed as well. In the production method, a virtual three-dimensional production model of the body is created by using a method according to the preceding description. It is possible for the features mentioned to be present individually or in any combination.

Subsequently, production data for an additive production device, in particular a 3D printing device, is created by using the virtual three-dimensional production model. The production data is formed from the production model and can contain additional information about the production. The body is then produced in a limited production area of the additive production device using the production data, wherein the body is produced in multiple parts in the form of a plurality of parts which are movably connected to one another via at least one connecting element and which are in a production position in which the corresponding joining surfaces of the parts are spaced apart from one another. The connected parts of the body reproduce the virtual three-dimensional partial models in finished form. The at least two parts of the body are connected to one another in a positive and/or non-positive manner by means of the connecting element in such a way that they can move relative to one another. The connecting element is advantageously designed as a connecting joint.

It is advantageous if parts of the body are moved from the production position into a joining position in which the corresponding joining surfaces of the parts abut one another.

Furthermore, it is advantageous if parts of the body are locked in the joining position, in particular via at least one locking element that is also produced by the additive production device. The locking element can thus prevent the at least two parts of the body from being moved from the joining position back to the production position. The at least one locking element can be a clip and/or a latching element, for example.

In addition, with the aid of the locking element and the associated holding of the partial models in the joining position of the at least two corresponding partial models, the joining of parts of the body to form the body subsequent to the production can be facilitated.

Furthermore, it is advantageous if the body is exposed to a solvent atmosphere in the joining position, so that a surface of the body is smoothed and/or the at least two parts of the body are positively connected to one another in the region of their abutting joining surfaces.

In addition, it is advantageous if, in particular after the parts of the body have been connected to one another, the connecting element and/or the locking element is at least partially removed. As a result, the body can be brought into its originally intended shape, which is depicted in the overall model.

It is also advantageous if the body is produced by using a powder-based 3D printing process. Powder-based 3D printing processes often comprise the limited production area. In addition or as an alternative, a powder application unit and/or an irradiation unit can also be limited to this production area with regard to their effective area. The method can thus also be used to produce large bodies in such printing methods large bodies in a simplified manner. With such a powder-based 3D printing method, powder materials made of plastic, metal, glass, ceramic and/or composite materials can be used. If plastic is used as the powder material, the 3D printing process is referred to as SLS. It is advantageous if the body is made from an elastomer, in particular TPU.

In an advantageous embodiment, at least one of the parts is produced with a lattice structure. If at least one of the parts of the body comprises lattice bars of the lattice structure on at least one of the joining surfaces, the connecting element and/or the locking element can be arranged on these lattice bars. Likewise, the parts of the body in the region of the lattice bars can be joined together at their joining surfaces.

Furthermore, a body, in particular a component, is proposed. The body is produced by using a production method as described above. It is possible for the features mentioned to be present individually or in any combination.

A device is proposed as well. The device advantageously comprises a computing unit for creating a virtual three-dimensional production model of a body. Additionally or alternatively, the device comprises an additive production device for the production of the body. In addition or as an alternative, the device comprises a chamber for smoothing a surface of the body and/or for positively connecting two parts of the body by means of a solvent atmosphere.

The computing unit is preferably designed to carry out at least some of the method steps of a method for creating a virtual three-dimensional production model of a body according to the preceding description. It is possible for the features mentioned to be present individually or in any combination. Additionally or alternatively, the additive production device and/or the chamber is designed to carry out at least some of the method steps of a production method for the production of a body according to the preceding description. It is possible for the features mentioned to be present individually or in any combination.

In the method for producing a composite body from at least two partial bodies produced in an additive production process, it is additionally or alternatively to the methods and/or devices above, it is advantageous if the at least two partial bodies are exposed to a solvent atmosphere in a chamber, so that one surface of the partial bodies is smoothed. It is advantageous, if the at least two partial bodies are placed in the chamber in such a way that they touch at least one joining surface and that the solvent atmosphere creates a material connection between the at least two partial bodies on the at least one joining surface. According to the above description, the at least two partial bodies can have been produced by using an overall model of the body, which was divided into at least two virtual partial models in a cell-conforming manner. Additionally or alternatively, these can have been produced by using a production model of a production position according to the preceding description. The features mentioned above can be present individually or in any combination.

The solvent atmosphere at least partially dissolves chemical bonds on the surface of the partial bodies. As a result, the molecules on the surface can rearrange themselves or are removed, which reduces the roughness of the surface. Furthermore, a material connection is thus created between the partial bodies at the joining surface. A separate step of joining the partial bodies thus becomes unnecessary. A partial body produced in an additive production process can be joined in this way, for example, to at least one partial body produced in an injection molding process and/or to at least one other partial body produced in an additive production process.

It is conceivable that the partial bodies are first placed in the chamber and then the solvent atmosphere is introduced into the chamber. On the other hand, it is conceivable that the partial bodies are introduced into a chamber provided with a solvent atmosphere. The solvent atmosphere is, for example, an aerosol, in particular a mist, i.e., a mixture of an atomized solvent and air, for example. On the other hand, it is conceivable to use solvent vapor in pure form or mixed with air, for example, as a gas mixture.

To accelerate the reaction, the chamber can be heated to a temperature of 25 to 100° C., for example. The method does, however, preferably takes place at room temperature. The solvent atmosphere can be produced, for example, by spraying a solvent or by atomizing the solvent, for example by means of an ultrasonic atomizer. A targeted evaporation of the solvent is conceivable as well.

Because of the health hazard and potential explosion hazard, the chamber is preferably hermetically sealed during the presence of the solvent atmosphere. It is conceivable that the solvent atmosphere is evacuated before the chamber is opened at the end of the process.

It is advantageous if the at least two partial bodies are joined together on the at least one joining surface in a positive-fitting manner. This improves the subsequent cohesion of the at least two partial bodies. In addition, it is easier to produce a homogeneous composite body in this way. The positive fit can result, for example, from the fact that the joining surface between the partial bodies is formed by boundary surfaces of unit cells of a lattice structure of the partial bodies.

If the partial bodies each have a lattice structure, the partial bodies touch one another, for example, along lattice bars of the lattice structure. These lattice bars can, for example, form the edges of the unit cells of the lattice structure. The positive fit described here can relate to the parallel alignment of the lattice bars. A plurality of joining surfaces can consist of a plurality of lattice bars aligned in parallel and in pairs.

It is particularly advantageous if at least one of the partial bodies is produced with a powder-based 3D printing process. In contrast to other 3D printing methods, this method makes it possible to print the partial bodies without an additional support structure. A subsequent removal of a support structure is therefore not necessary.

In powder-based 3D printing processes, the bodies to be printed are built up layer by layer from a powder. This usually starts with the bottom layer with a binder being applied to a layer of powder, for example, which hardens and binds the powder in a targeted manner. The next layer of powder is then applied and treated with the binder as well. It is also conceivable to harden and bind the powder in a selective heating process.

In this context, the printed body is always in a loose powder environment that protects and supports the body. After this process, the body generally has a rough surface which, however, is smoothed in the solvent atmosphere within the context of the method. Naturally, both or all of the at least two partial bodies can be produced in the powder-based 3D printing process.

It is also advantageous if at least one of the two partial bodies is produced with a lattice structure. Due to the lattice structure, a large volume can be filled with little material. The elasticity of the partial body can also be precisely controlled by the lattice structure. This is particularly advantageous for padding. Ideally, the joining surface of the partial bodies is no longer recognizable in the composite body, at least on the basis of an inhomogeneous elasticity. Both or all of the at least two partial bodies can be produced with a lattice structure. In this case, the lattice structure of the partial bodies is preferably the same.

It is advantageous if the at least two partial bodies are placed in the solvent atmosphere in such a way that they touch at a plurality of joining surfaces, the plurality of joining surfaces corresponding to a plurality of boundary surfaces of the unit cells of the structure of the partial bodies. This ensures that the structures of the partial bodies complement each other to form a structure of the composite body that is as uniform as possible. This improves the homogeneity, particularly with regard to the elasticity of the body. The structure described can be any structure that is made up of a large number of identical unit cells, i.e., the smallest space-filling components. In particular, the structure is a lattice structure. The boundary surfaces separate the individual unit cells from one another. They do not necessarily have to be filled with material. The lattice bars joined to one another may form the edges of a boundary surface as well, for example.

Preferably, this aspect is already taken into account in the design or in the subdivision of the body into partial bodies before the production of the partial bodies. The lattice structure of the body is separated, for example, into the partial bodies along the boundary surfaces of the unit cells of the structure (so-called "cell-conforming cutting").

It is also advantageous if the partial bodies are joined together in such a way that a uniform lattice structure of the composite body is formed. As already described, this can improve the homogeneity, in particular with regard to the elasticity of the body.

Especially when the body is padding or part of a padding element with which a subsequent user has direct contact, inhomogeneities in the elasticity can be uncomfortable for the user and thus disadvantageous for the economic success of the body. This is to be avoided.

It is advantageous if the at least two partial bodies are produced with at least one connecting element, in particular a connecting joint. In addition or as an alternative, it is advantageous if the at least two partial bodies are folded together via the connecting element so that the two partial bodies rest against one another with their corresponding joining surfaces. This ensures an error-free assembly of the partial bodies along the at least one joining surface. In particular, the freedom of movement of the partial bodies relative to one another can be restricted by one or more joints in such a way that the partial bodies can only be assembled in one way to form the body. It is conceivable to "collapse" the partial bodies to form the body. The connecting joint or the connecting joints can also be produced by the additive production process. If necessary, the joint or joints can be removed again after the partial bodies have been joined to form the body.

In the case of a particularly wide body that exceeds the width of the printing device, it is conceivable to subdivide the body into at least two partial bodies that can be printed one above the other and that are possibly joined to the described connecting joint or joints. In particular, two connecting joints can be provided.

Furthermore, it is advantageous if the at least two partial bodies are produced from a thermoplastic, in particular polyamide 12 (PA12) and/or an elastomer, in particular TPU. On the one hand, this makes it easier to produce the partial bodies. On the other hand, after the parts have been joined together, this results in an elastically deformable but dimensionally stable body, for example, which can be used in particular as padding.

Examples of elastomers are vulcanizates of natural or silicone rubber. The abbreviation TPU stands for thermoplastic polyurethane. Polyurethanes are plastics or synthetic resins that result from a polyaddition reaction of dialcohols or polyols with polyisocyanates. Padding or thermal insulation materials in particular can advantageously be produced from foamed TPU. The thermoplastic properties are particularly advantageous during the production of products from these materials.

There are particular advantages when the solvent atmosphere contains chloroform, tetrahydrofuran, dimethylformamide, dimethylacetamide, N-methylpyrrolidone, dimethyl sulfoxide, hexafluoroisopropanol, pyridine and/or benzyl alcohol. These solvents are capable of dissolving TPU in particular and are therefore suitable for smoothing the surface of the partial bodies in an atmosphere and for establishing a positive connection between the partial bodies. It is conceivable to use a mixture of different solvents in the solvent atmosphere. As already described, an aerosol and/or a vapor can be produced from these solvents to create the solvent atmosphere.

The composite body is composed of at least two partial bodies with at least one of the partial bodies being produced in an additive production process. It is characterized in that it is produced according to a method as described above. As already described, the body has the advantage that the partial bodies are already joined together while the surface of the partial bodies is being smoothed and thus eliminating an additional work step of joining them together during the production of the body. In addition, the body may have a size that exceeds the printing range of a printing device for an additive production process. It is conceivable that the body is composed of a large number of partial bodies.

The body has a lattice structure, for example, with the lattice structure preferably being homogeneous across the entire extent of the body. Motifs of the lattice structure are repeated at regular intervals, for example. The body is made, for example, from an elastomer and in particular from TPU. The body is designed in particular as padding or part of a padding element with a homogeneous elasticity.

BRIEF DESCRIPTION OF DRAWING FIGURES

Figure 2:
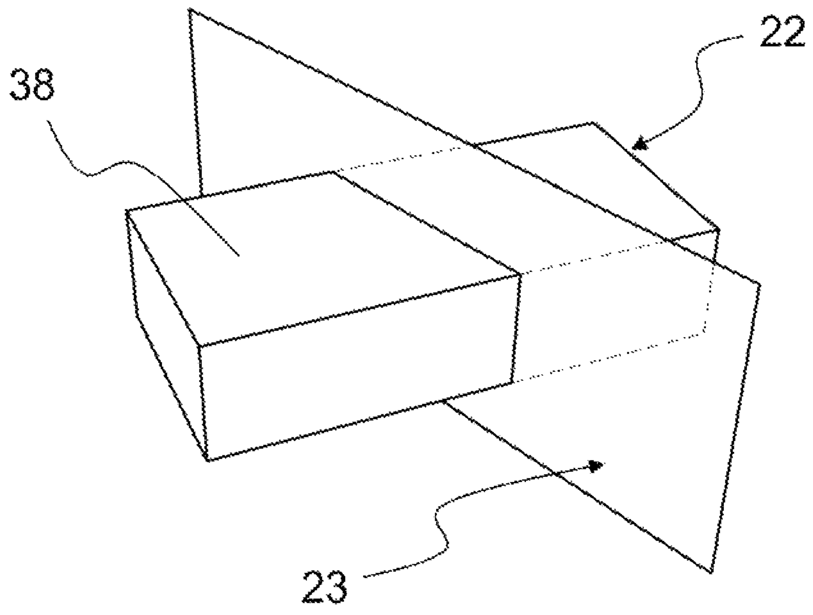
Figure 3:
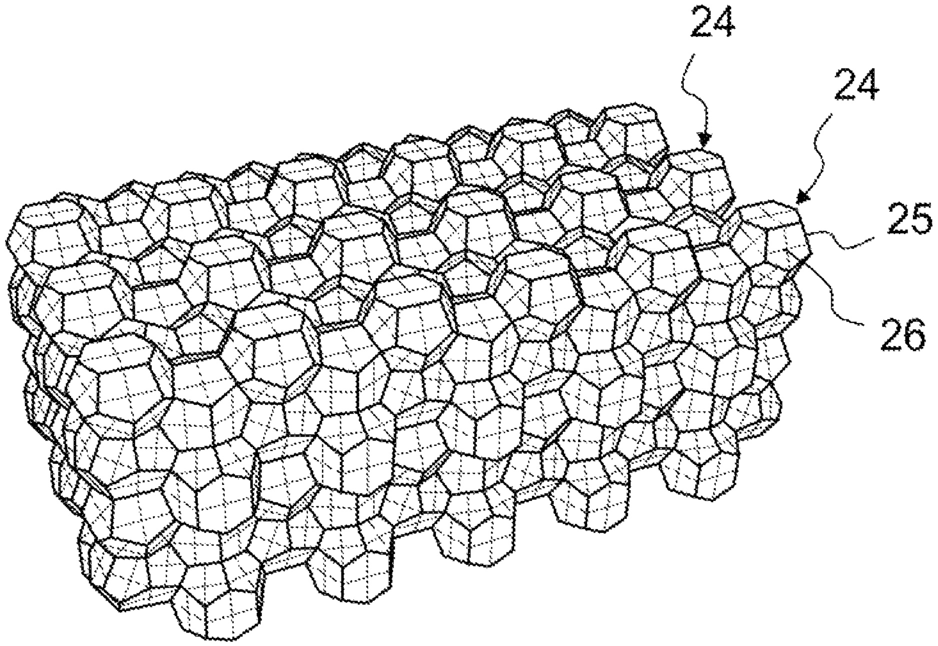
Figure 4:
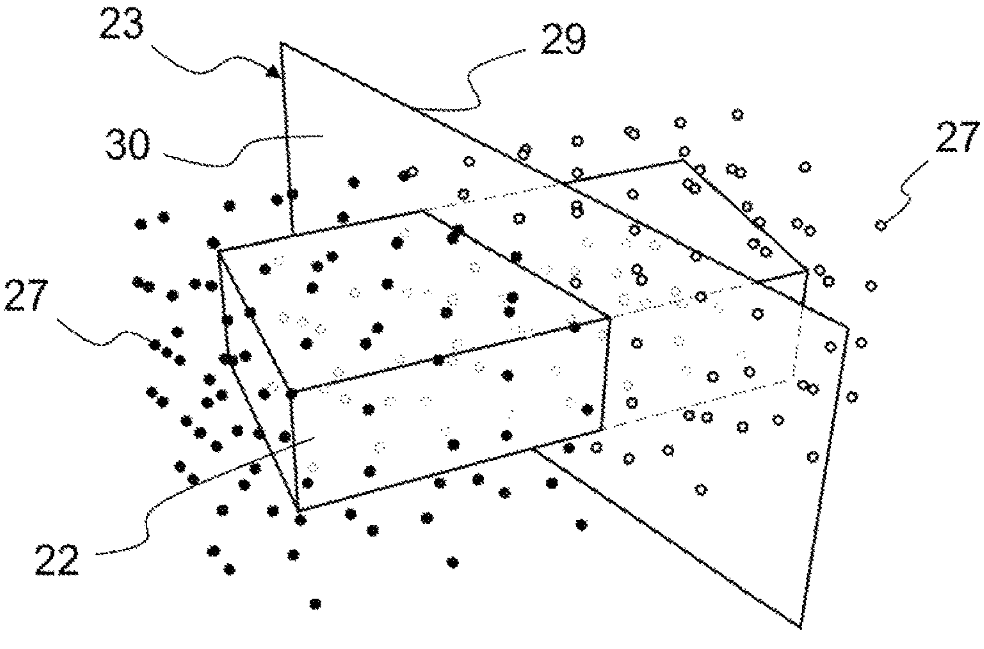
Figure 5:
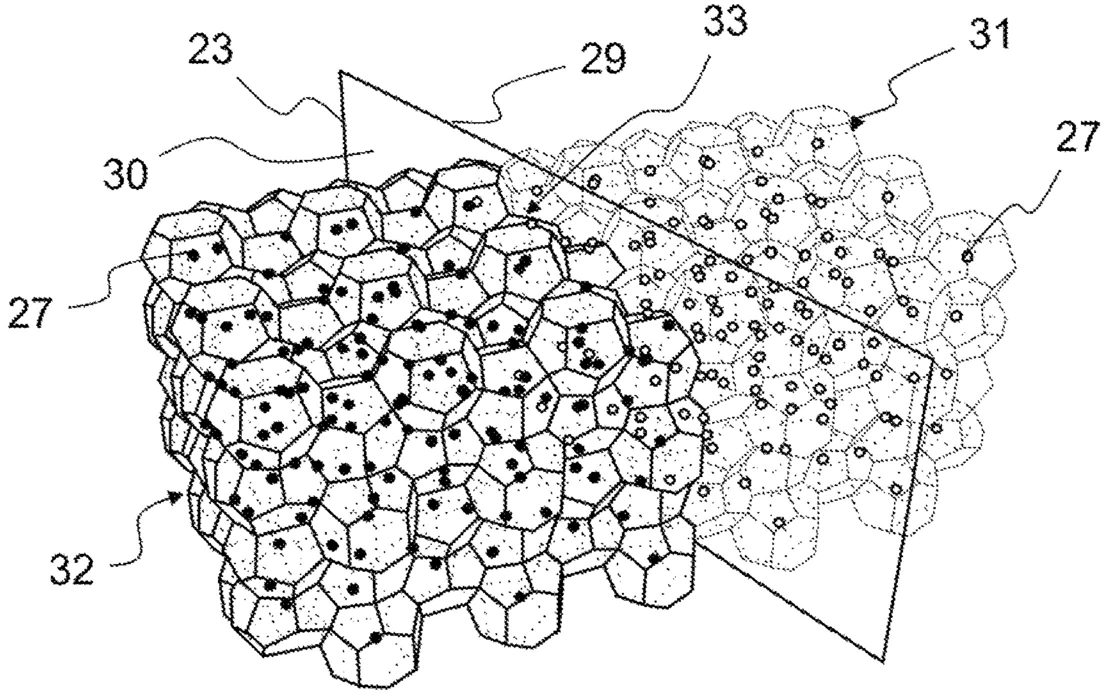
Figure 6:
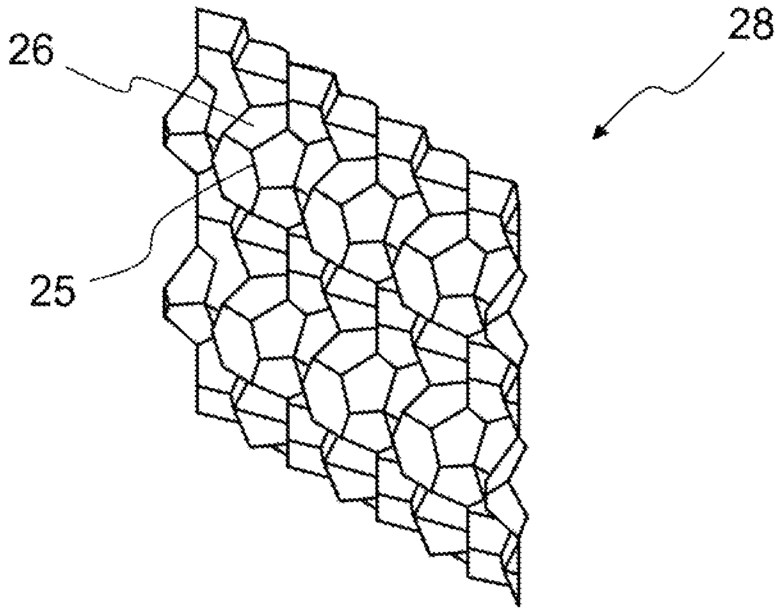
Figure 7:
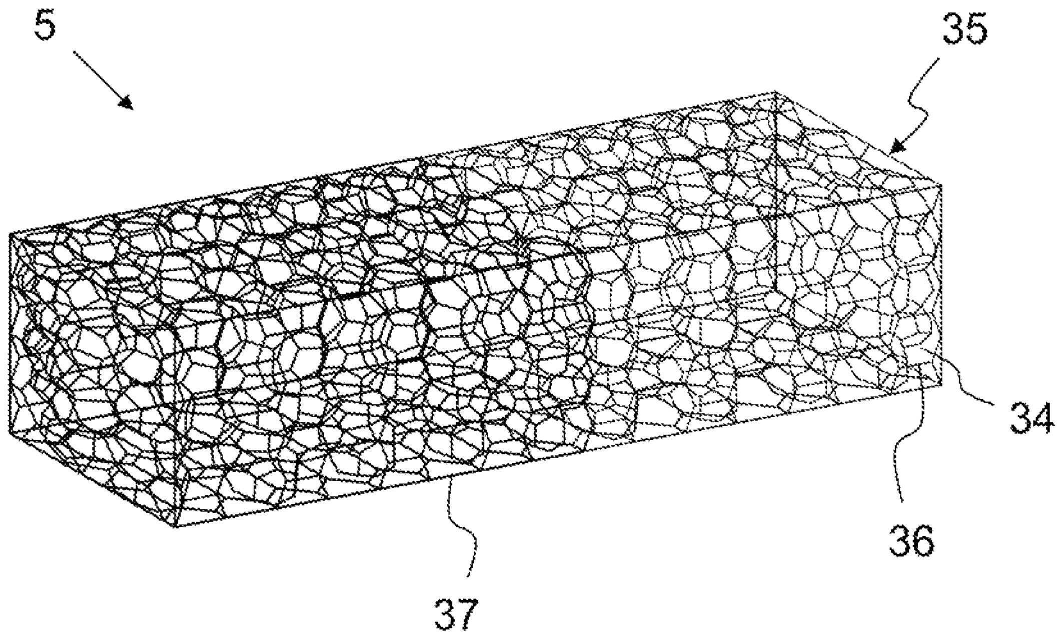
Figure 8:
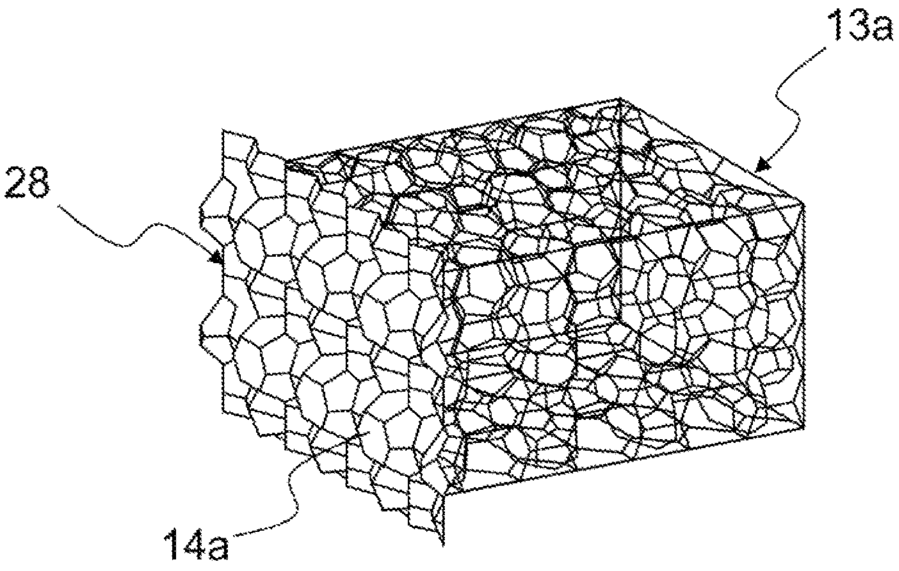
Figure 9:
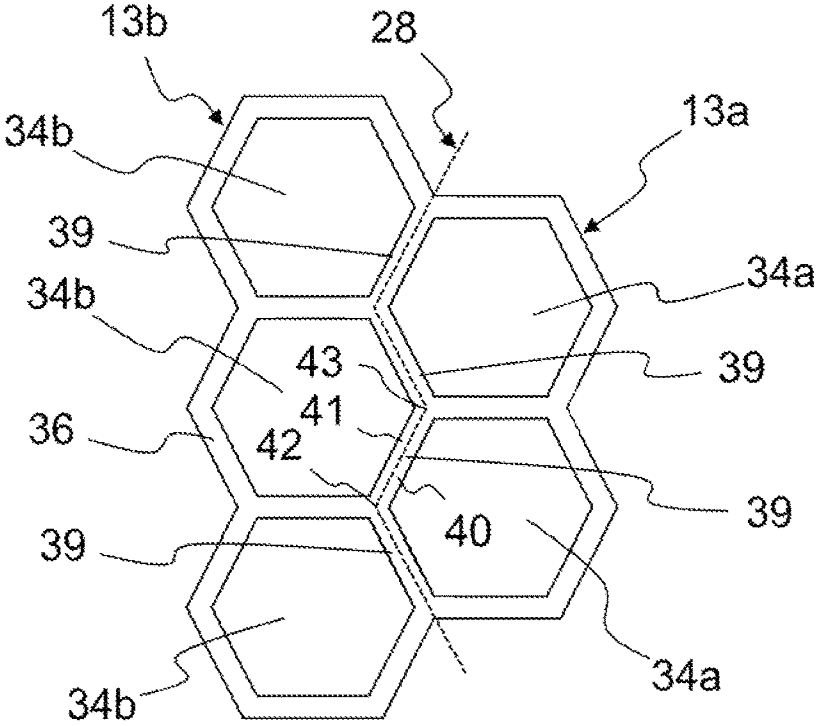
Figure 10:
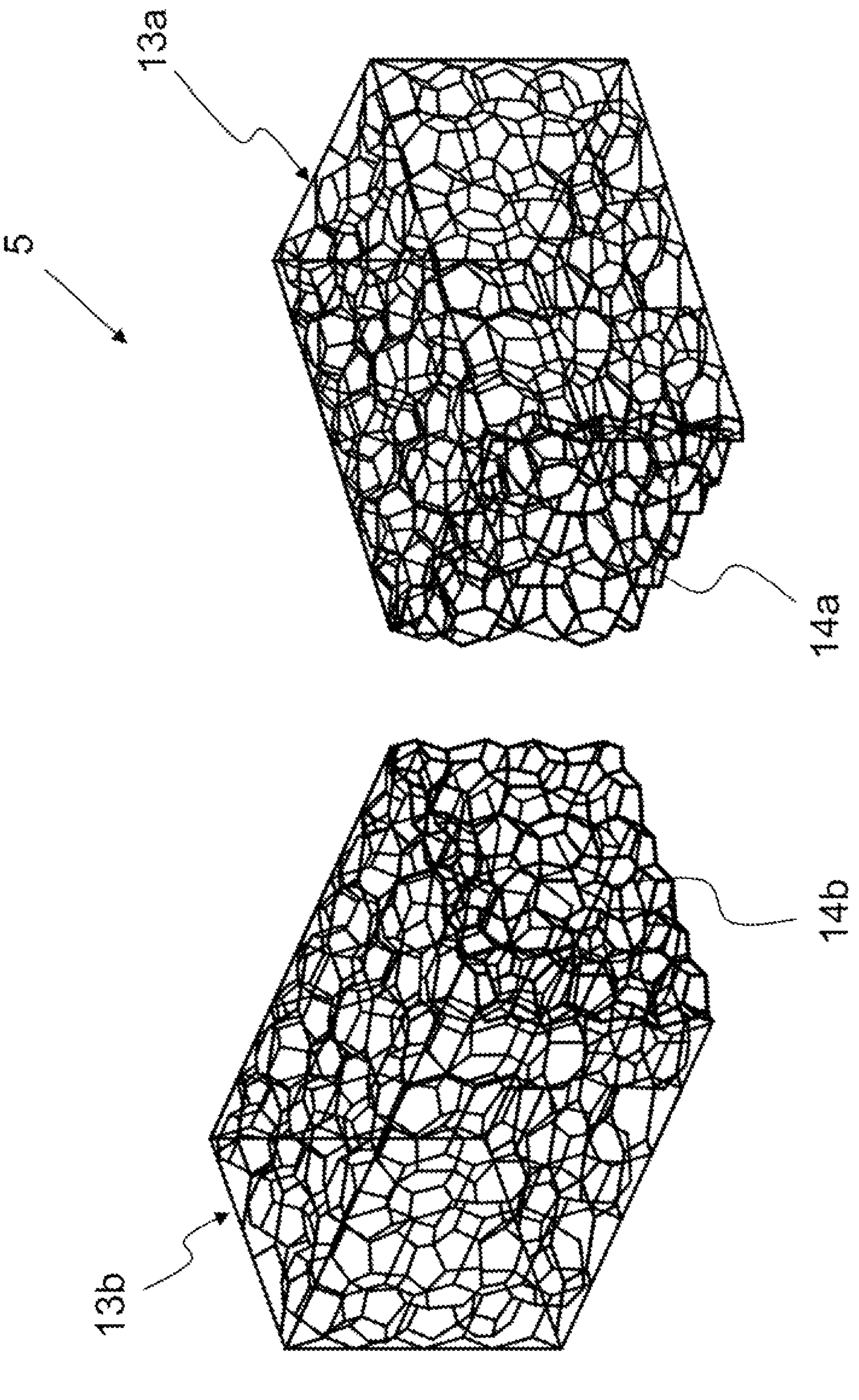
Figure 11:
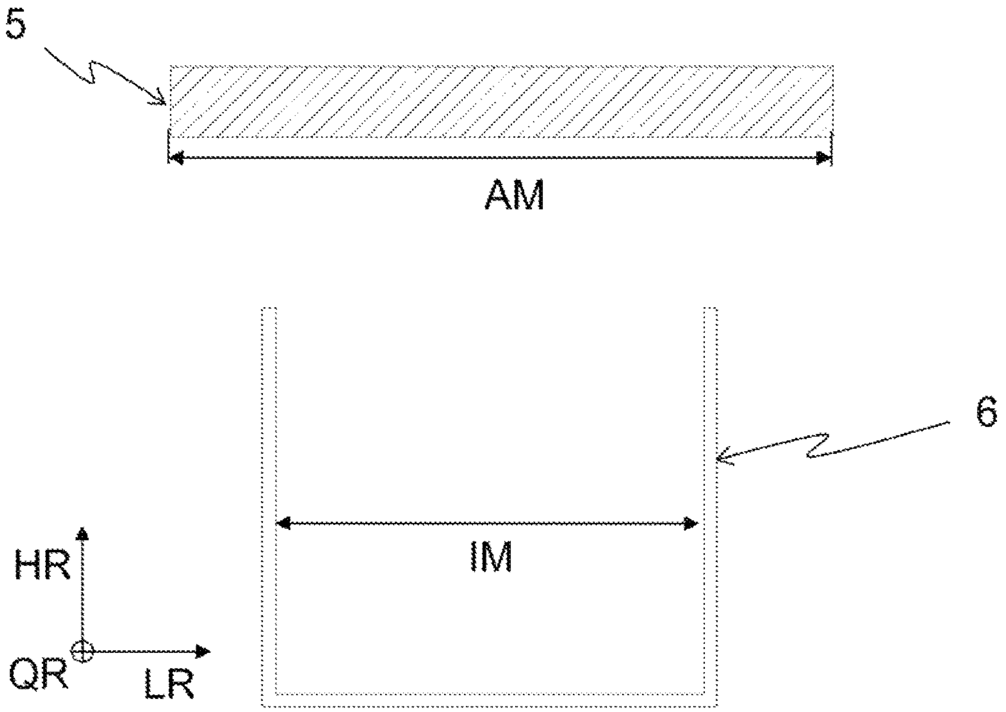
Figure 12:
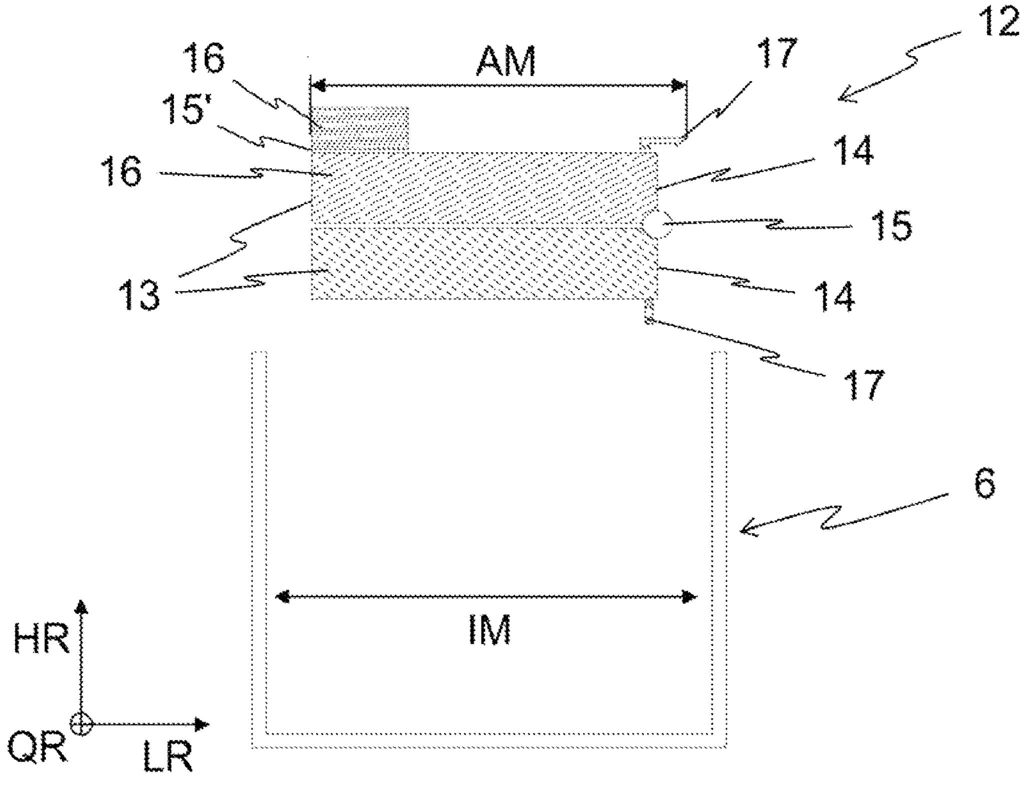
Figure 13:
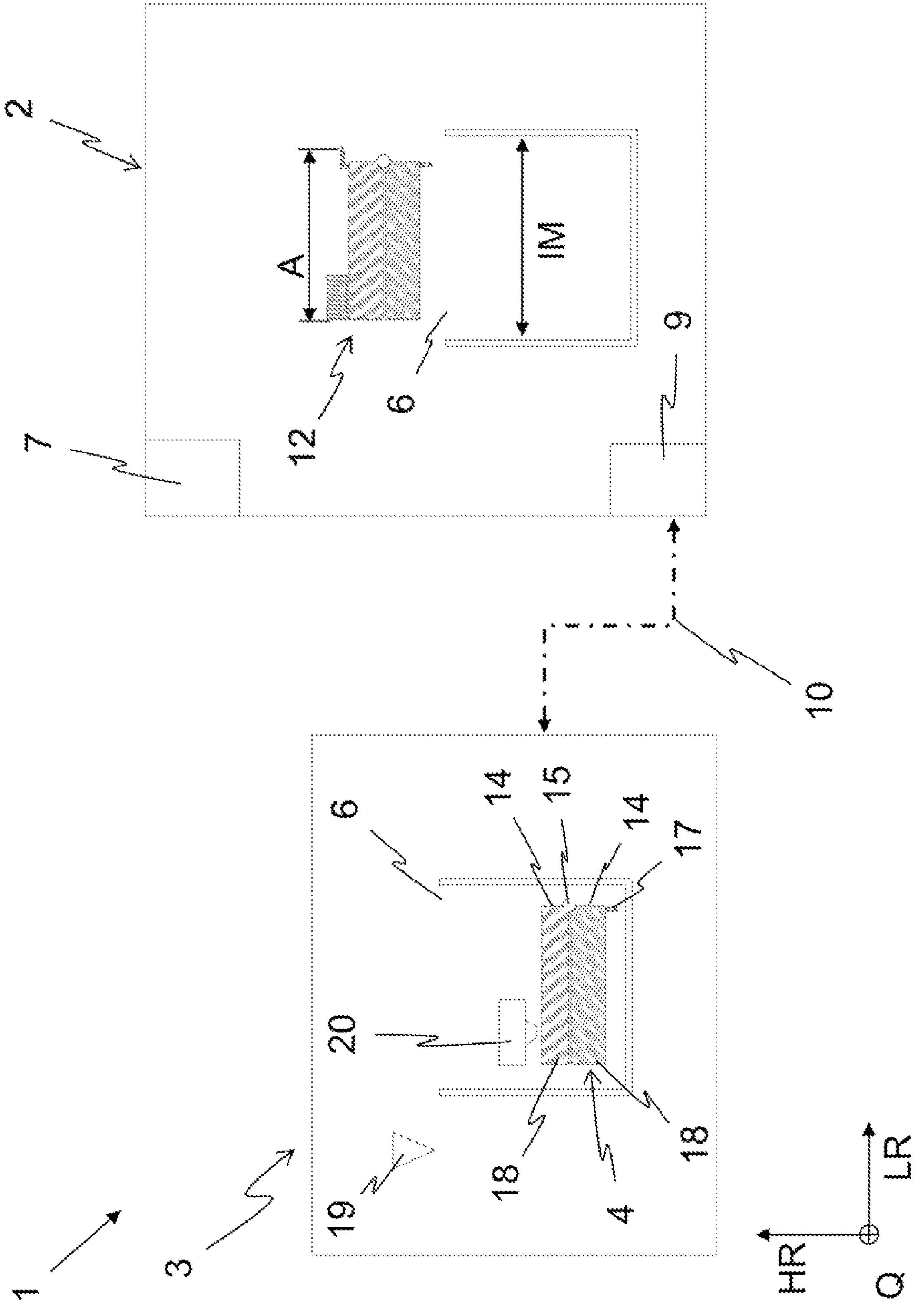
Figure 14:
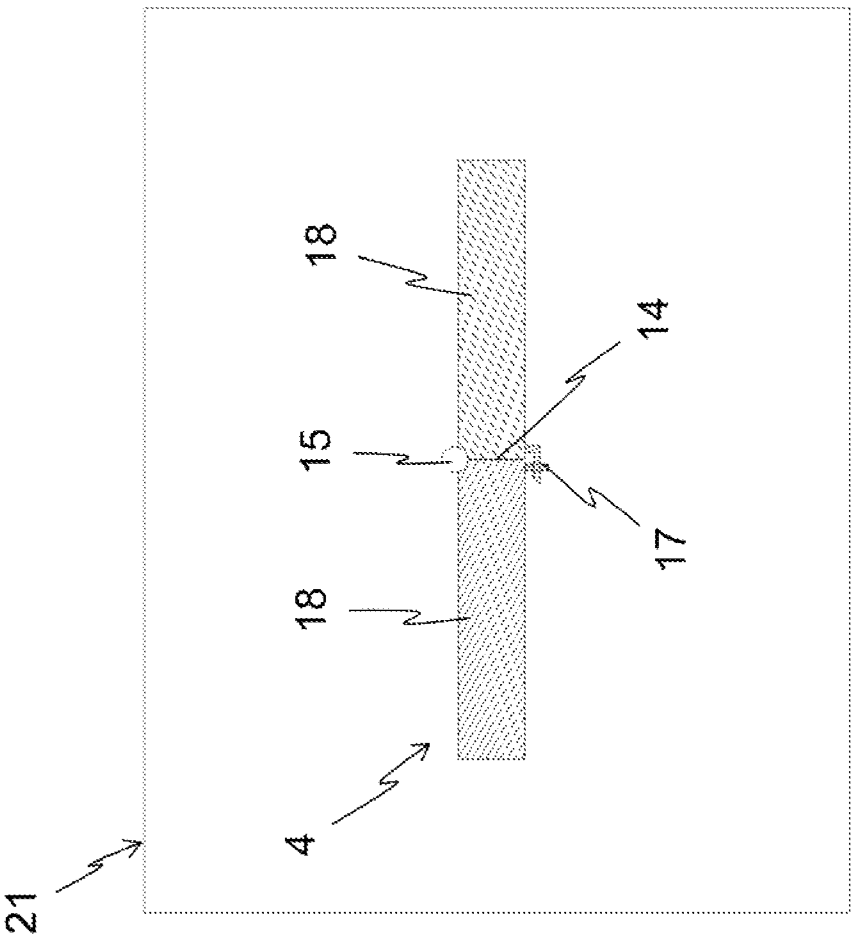
Figure 15:
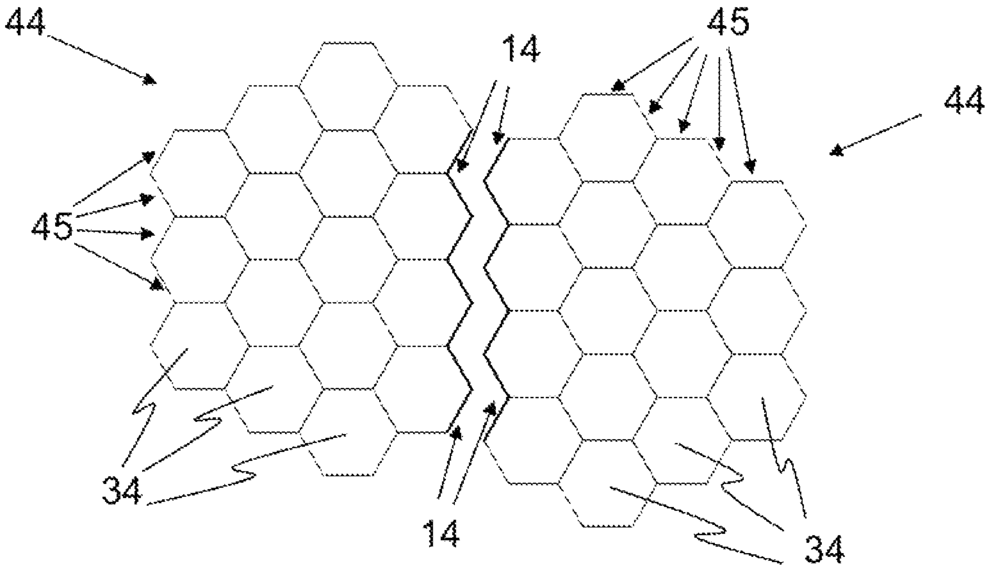
Figure 16:
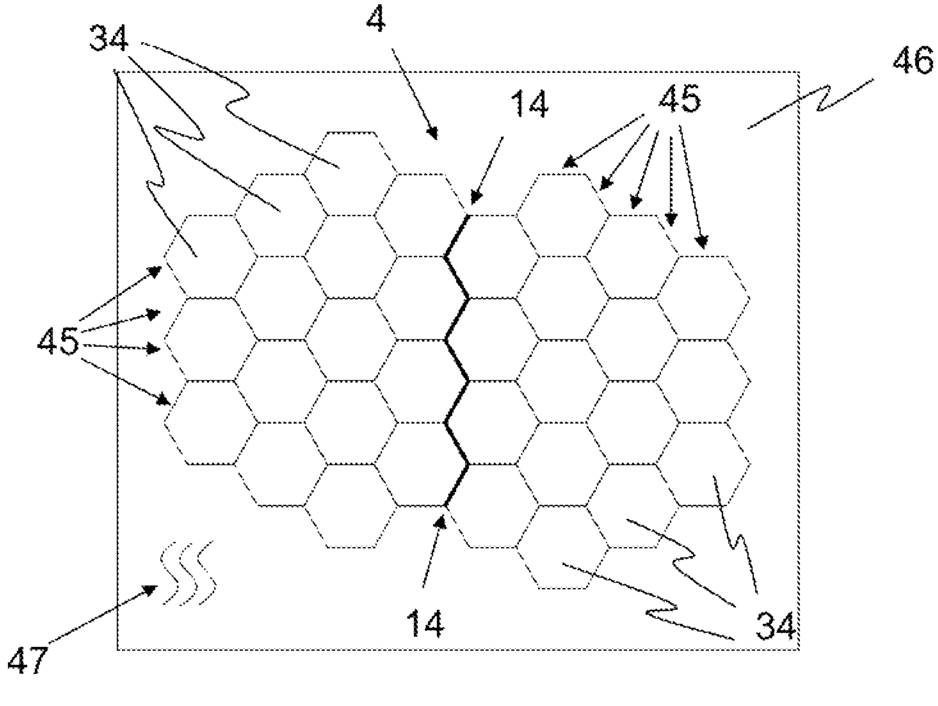

Further advantages of the invention are described in the following embodiments. In the drawings:

FIG. 1 is a schematic representation of a device with a computing unit, an additive production device, a body to be produced and a storage medium, FIG. 2 is a perspective view of a base body with a cut surface, FIG. 3 is a perspective view of a basic body filled with unit cells, FIG. 4 is an assignment of center points of the unit cells to one side of the cut surface, FIG. 5 is an assignment of the unit cells to one side of the cut surface, FIG. 6 is a perspective view of a three-dimensional cell-conforming cut surface, FIG. 7 is a perspective view of an overall model with a lattice structure formed from a large number of cells, FIG. 8 is a first partial model with the cell-conforming dividing cut surface, FIG. 9 is a detailed sectional view of the two partial models divided from each other in the region of the separating surface, FIG. 10 is a perspective view of the overall model divided into two partial models, FIGS. 11 and 12 are schematic representations of the method for creating a virtual three-dimensional production model of a body, FIG. 13 is a schematic representation of a device with a computing unit and an additive production device when producing a body, FIG. 14 is a schematic representation of a body in the joining position in a chamber for the smoothing and/or for the positive connection, FIG. 15 is a two-dimensional diagram of partial bodies before they are joined and FIG. 16 is a two-dimensional diagram of the production of the body by positively connecting the partial bodies by using a solvent atmosphere.

DETAILED DESCRIPTION

In the following description of the figures, the same reference signs are used for features that are identical and/or at least comparable in the various figures. The individual features, their design and/or mode of action are generally explained in detail when they are mentioned the first time. If individual features are not explained in detail again, their design and/or mode of action corresponds to the design or mode of action of the features already described that have the same effect or the same name.

FIG. 1 shows a schematic representation of a device 1 with a computing unit 2, an additive production device 3 and a body 4 to be produced. The body 4 to be produced is to be understood as the body 4 that is to be produced with the aid of the production method and/or the additive production device 3. A virtual three-dimensional overall model 5 is formed and/or created with the aid of the computing unit 2 based on the body 4 to be produced. The overall model 5 and the body 4 to be produced each have the same external dimensions AM in the three spatial directions, i.e. in the longitudinal direction LR, the transverse direction QR and the vertical direction HR. The production device 3 has a limited production area 6. For this purpose, the production area 6 spans a limited internal dimension IM in each of the three spatial directions, i.e., in the longitudinal direction LR, the transverse direction QR and the vertical direction HR. This can make it necessary for the overall model 5 to be divided so that it can be produced, in particular printed, in the limited production area 6.

The computing unit 2 can comprise at least one input interface 7 for detecting, inputting and/or determining the at least one external dimension AM and/or internal dimension IM. Using the input interface 7, geometrical data 8 of the body 4 to be produced and/or the production device 3 can be recorded, entered and/or determined automatically and/or with the help of a user. The overall model 5 can be created on the basis of this geometrical data 8. Additionally or alternatively, a digital image of the production device 3 and/or the internal dimension IM can be entered and/or stored in the computing unit 2. Additionally or alternatively, the computing unit 2, as shown in the embodiment, can have an output interface 9 for outputting production data 10 to the production device 3 and/or to a computer-readable storage medium 11. This production data 10 can be created with the aid of the computing unit 2.

A method, in particular a computer-implemented method, for dividing the virtual three-dimensional overall model 5 is illustrated in FIGS. 2 to 10. As mentioned above, it may be necessary for the overall model 5 to be divided into at least two partial models 13 so that it can be produced in a limited production area 6 of the production device 3, in particular a 3D printer.

For this purpose, according to FIG. 2, a three-dimensional virtual base body 22 is provided first. This can be done manually by a user in a corresponding program. Alternatively, the geometrical data 8 of the base body 22 can also be imported via an interface. The base body 22 reproduces the basic geometry of the body 4 to be printed. At least one cut surface 23 dividing the base body 22 is then defined. The exact position and/or geometry of the cut surface 23 can be defined manually by a user or automatically by the computing unit 2. In this case, the cut surface 23 can be flat, curved and/or kinked. Alternatively or additionally, the cut surface can also have a free-form geometry. Furthermore, the cut surface can be composed of a plurality of different and/or identical portions.

Subsequently, in a following step according to FIG. 3, the base body 22, in particular its volume, is filled with a plurality of unit cells 24. The volume of the base body 22 is preferably completely filled with such unit cells 24. For reasons of clarity, only two of these unit cells are provided with a reference number in FIG. 3. The body 22 may be filled with a single type of unit cell 24. Alternatively, different types of unit cells 24, which differ from one another in terms of their external shape, can be used. Each of these unit cells 24 comprises a plurality of edges 25 which define the outer shape of the respective unit cell 24. The outer shape of the respective unit cell 24 is also formed by a corresponding cell surface 26. Furthermore, each of these unit cells 24 includes a center point 27 (see FIG. 4).

An essential step of the method consists in the creation of a virtual separating surface 28 for the overall model, as shown in FIG. 6, with the separating surface 28 having a three-dimensional, cell-conforming shape. The term "cell-conforming" is to be understood as referring to a shape of the separating surface 28 which runs on the outer surface of several of these unit cells 24 and therefore does not divide any of the unit cells 24. Basically, the separating surface 28 runs on the edges 25 and/or cell surfaces 26 of the adjacent unit cells 24.

The three-dimensional cell-conforming shape of the separating surface 28 is preferably created by an algorithm that is stored on the computing unit 2. The three-dimensional cell-conforming shape of the separating surface 28 is created by using the cell surface 26 and/or the edges 25 of the unit cells 24 adjacent to the respective cut surface 23. For this purpose, according to FIG. 4, the unit cells 24 are first assigned relative to the cut surface 23. Accordingly, the cut surface 23 comprises a first side 29 and an opposite second side 30. At least the whole unit cells 24 located in the region of the cut surface 23 are each assigned to one of the two sides 29, 30 of the cut surface 23. A corresponding assignment preferably takes place at least for those unit cells 24 that are cut by the cut surface 23. In particular, however, all unit cells 24 with which the base body 22 was filled are assigned to one side 29, 30 of the cut surface 23.

As can be seen from FIGS. 4 and 5, the unit cells 24 are assigned via their respective center points 27. This way, the whole unit cells 24 are assigned to the side 29, 30 of the cut surface 23 on which their center point 27 is located as well. To visualize the assignment, all center points 27 of the unit cells 24 that are assigned to the first side 29 are shown as dots in FIGS. 4 and 5, and all center points 27 of the unit cells 24 that are assigned to the second side 30 are shown as circles.

According to FIG. 5, a respective unit cell group 31, 32 is assigned to each of the two sides 29, 30 of the cut surface 23 at the end of this method step. Alternatively, an assignment can be made for only one of the two sides 29, 30 of the cut surface 23. The two unit cell groups 31, 32 have a three-dimensional cell-conforming abutting surface 33 in the region of the cut surface 23. The two unit cell groups 31, 32 lie flush against one another on this abutting surface 33. Due to the illustration, only the outer contour of this abutting surface 33 can be seen in FIG. 5.

The separating surface 28 shown in FIG. 6 is now created by using at least one of the two unit cell groups 31, 32. Accordingly, in a further method step, the shape of the separating surface 28 is created correspondingly and/or using the three-dimensional cell-conforming abutting surface 33 of at least one of the two unit groups 31, 32. As can be seen from FIG. 6, the separating surface 28 thus has a cell-conforming shape which corresponds to the edges 25 and/or the cell surface 26 of those unit cells 24 which form the abutting surface 33 of the two unit groups 31, 32. The separating surface 28 thus has edges 25 and/or cell surfaces 26 of the unit cells 24 adjacent to it, which define its shape and/or geometry.

Before, during or after the creation of the virtual three-dimensional separating surface 28, the overall model 5 of the body 4 shown in FIG. 7 is created from the base body 22 shown in FIG. 3, which has been filled with a plurality of complete and/or closed unit cells 24. In this case, the overall model 5 has a plurality of cells 34 which together form a lattice structure 35. The overall model 5 of the body 4 is a volume model. For this purpose, the unit cells 24 shown in FIG. 3 are replaced with struts 36, which themselves have a volume. The struts 36 extend along the edges 25 of the unit cells 24 and form the cells 34 which correspond to the unit cells 24 and which in turn form the lattice structure 35.

The overall model 5 shown in FIG. 7 with its lattice structure 35 can comprise a surface lattice structure 37 which forms an outer surface of the lattice structure 35. To create the surface lattice structure 37, the unit cells 24 shown in FIG. 3 are intersected with an outer surface 38 of the base body 22 shown in FIG. 2.

The lattice structure 35 of the overall model 5 shown in FIG. 7 can now be divided into the partial models 13*a*, 13*b* shown in FIG. 10 with and/or along the separating surface 28 shown in FIG. 6. FIG. 8 shows one of the two partial models 13*a* with the cell-conforming dividing cut surface 28. As can be seen from FIG. 8, the cells 34 are closed in the area of the separating surface 28. None of the struts 36 of these cells 34 are cut.

FIG. 9 shows the cell-conforming division of the overall model 5 into the two partial models 13*a*, 13*b* in a callout. Thus, the first partial model 13*a* has first cells 34*a* and the second partial model 13*b* has second cells 34*b*. Both the first cells 34*a* and the second cells 34*b* are closed. The mutually adjacent first cells 34*a* of the first partial model 13*a* and the second cells 34*b* of the second partial model 13*b* share a common strut 36, which is referred to below as common struts 39. As can be seen from FIG. 9, these common struts 39 of the lattice structure 35 are divided by means of the cell-conforming separating surface 28 in such a way that the corresponding cells 34 remain whole and/or closed. Accordingly, the common struts 39 are not divided by the cell-conforming separating surface 28 in their transverse direction, but rather in their respective longitudinal direction. As a result, the parts 40, 41 of a respective common strut 39 each extend without gaps and/or continuously between two nodes 42, 43 of the respective corresponding cell 34. The corresponding cells 34*a*, 34*b* thus remain complete and/or closed. This ensures a very high stability of the lattice structure 35. In the embodiment illustrated in FIG. 9, the common struts 39 are divided axially symmetrical. Alternatively, however, an asymmetrical division can also take place, so that the two parts 40, 41 are designed differently from one another.

FIG. 10 shows the overall model 5 with its partial models 13*a*, 13*b*. Both partial models 13*a*, 13*b* now have a mutually corresponding joining surface 14*a*, 14*b* due to the cell-conforming division. Each of these mutually corresponding joining surfaces 14*a*, 14*b* is formed from parts 40, 41 of the common struts 39. When these two part models 13*a*, 13*b* are joined together, the two parts 40, 41 that correspond to one another again form a complete common strut 39.

FIGS. 11 and 12 show an exemplary method sequence of a method for creating a virtual three-dimensional production model 12 of a body 4. This method can follow the above method for dividing the overall model 5, but it is possible as well for the above features to be present individually or in any combination. The method sequence described here can be carried out completely or partially in the computing unit 2 of FIG. 1. The overall model 5 and the limited production area 6 are shown in FIG. 11. In the exemplary embodiment shown, the external dimension AM of the overall model 5 exceeds the corresponding internal dimension IM of the production area 6, at least in the longitudinal direction LR. Additionally or alternatively, the external dimension AM of the overall model 5 can exceed the corresponding internal dimension IM of the production area 6 in another spatial direction, for example in the transverse direction QR. This can be adjusted in an additional and/or in the same method step.

FIG. 12 shows a method step following the method step of FIG. 11. The overall model 5 of the embodiment in FIG. 11 was divided into two partial models 13. It is also conceivable that the overall model 5 is divided into a number of partial models 13. Each of the partial models 13 now has a joining surface 14, which can be used for joining purposes in a later production process. In addition, a connecting element 15, which connects the two part models 13 to one another, was formed for this purpose. The two partial models 13 are movably connected to one another by means of the connecting element 15 in such a way that they can be moved relative to one another from a production position shown here, in which the corresponding joining surfaces 14 of the partial models 13 are spaced apart, to a joining position in which the corresponding joining surfaces 14 of the partial models 13 abut each other. A body 4 in the joining position is shown in FIG. 14, for example. In the embodiment shown, the connecting element 15 is designed as a connecting joint, by means of which the two partial models 13 can be pivoted relative to one another.

In addition to the two partial models 13, two sub-partial models 16 are shown in FIG. 12, with one of the two partial models being one of the sub-partial models 16. Additionally or alternatively, the other partial model 13 can be divided into sub-partial models 16. It is also conceivable that at least one of the partial models 13 is divided into a number of sub-partial models 16. An additional optional iteration step of the method was carried out in this regard. In this optional iteration step, at least one of the external dimensions AM of the partial models 13 located in the production position was compared to the corresponding internal dimension IM of the production area 6. In the embodiment shown, the external dimension AM is compared to the corresponding internal dimension IM in the transverse direction QR. Since the external dimension AM of one of the partial models 13 in the production position exceeds the internal dimension IM of the production area 6 in the transverse direction QR, this partial model 13 was divided into two sub-partial models 16 and moved into the production position with the aid of a further connecting element 15'. In the embodiment shown, the two partial models 13 and the sub-partial models 16 are arranged in the production position one above the other in the vertical direction HR.

In addition, at least one locking element 17 is advantageously arranged on at least one of the partial models 13 and/or sub-partial models 16. In the embodiment shown, a part of the locking element 17 is arranged on each of the two partial models 13. The locking element 17 is designed here as a detent and receptacle for the detent. The locking element 17 can lock the two corresponding partial models 13 in the joining position in which the two joining surfaces 14 abut one another. A body 4 in the joining position is shown in FIG. 14, for example. It is also conceivable that the locking element 17 is integrated in the connecting element 15. In addition or as an alternative, at least one of the sub-partial models 16 can have the locking element 17.

In the embodiment shown in FIG. 12, the production model 12 is thus created. The production model 12 comprises the two partial models 13, the two sub-partial models 16, the connecting elements 15, 15' and the locking element 17. The external dimension AM of the production model 12 is less than the internal dimension IM of the production area 6 in each of the spatial directions LR, QR, HR and can thus be produced and/or created with the production device 3 of FIG. 1. For this purpose, the production data 10 is created from the production model 12 and sent to the production device 3, in particular by means of the computing unit 2 of the device 1 of the embodiment in FIG. 1. This process step is shown in FIG. 13.

FIG. 13 shows a schematic representation of a device 1 with a computing unit 2 and an additive production device 3 when producing a body 4. The computing unit 2 has already created the production model 12, in particular in accordance with the preceding description. For this purpose, the computing unit 2 can have a computer program and/or artificial intelligence which executes at least some of the method steps of the method for creating the virtual three-dimensional production model 12 of the body 4.

The production model 12 is designed similarly to the embodiment in FIG. 12. The production data 10 is then created from the production model 12 and transmitted to the production device 3 by means of the output interface 9. The production device 3 has already created the first layers of the body 4. The body 4 is made in a plurality of parts in the form of a plurality of parts 18 which are movably connected to one another via the at least one connecting element 15. In the embodiment shown, the parts 18 are in the production position. Since the embodiment shown is a powder-based 3D printing method, the production device 3 comprises a powder application unit 19 for applying a material powder and an irradiation unit 20 for solidifying the material powder. For the sake of clarity, the non-solidified powder surrounding the body 4 is not shown.

FIG. 14 is a schematic representation of a body 4 in the joining position in a chamber 21 for smoothing and/or for the positive connection. The body 4 has been created with a method and/or a device 1 according to the previous embodiments of FIGS. 1 to 13. The chamber 21 can also be part of the device 1. The production device 3 of FIGS. 1 and 13 can form the chamber 21 as well.

Following the production, which is shown in FIG. 13, the parts 18 of the body 4 were moved from the production position to the joining position by means of the connecting element 15. Since the connecting element 15 is a rotary joint in the embodiment shown, the two parts 18 of the body 4 have been pivoted into the joining position. The two corresponding joining surfaces 14 are in this joining position. In addition, as shown here, the locking element 17 can engage in such a way that the two parts 18 cannot be moved back into the production position.

In the joining position, the body 4 can be exposed to a solvent atmosphere that can be formed in the chamber 21. As a result, the surface of the body 4 can be smoothed and/or the parts 18 of the body 4 can be positively connected to one another in the region of their abutting joining surfaces 14. If the two parts 18 are positively connected to one another in the region of the joining surfaces 14, the connecting element 15 and/or the locking element 17 can then optionally be removed. As a result, protruding elements can be removed from the body 4. Additionally or alternatively, the connecting element 15 can be designed as a film hinge. Such a connecting element 15 can be formed in such a way that it does not protrude from the body 4.

FIG. 15 shows two partial bodies 44 in a two-dimensional diagram that are joined together to form the body 4. The partial bodies 44 can each be produced from a virtual partial model 13*a*, 13*b* as described above. It is possible for the features mentioned to be present individually or in any combination. Additionally or alternatively, the partial bodies 44 can be designed as a production model 12 according to the above description, wherein the partial bodies 44 are, in this case, connected to one another via at least one connecting element 15 and/or in a reduced production position relative to one another.

The two-dimensional representation serves to illustrate the principle. As a rule, the body 4 will have a three-dimensional shape according to the above description. As shown in FIG. 15, the two partial bodies 44 have a matching lattice structure 35, which is preferably divided in a cell-conforming manner in accordance with the previous description. The lattice structures 35 have a plurality of cells 34. A combination of different lattice motifs as the smallest unit of the lattice is conceivable as well.

The partial bodies 44 are delimited in such a way that only whole and/or closed cells 34 are present in the lattice structure 35. In other words, the partial bodies 44 are delimited by boundary surfaces 45 of the cells 34. Likewise, a respective joining surface 14 of the partial bodies 44, where the partial bodies 44 touch during the process (see also FIG. 16), is formed by a plurality of boundary surfaces 45 of the cells 34.

FIG. 16 shows the method for producing the composite body 4 in a two-dimensional diagram. The at least two partial bodies 44 produced in an additive production process, in particular according to the preceding description, are placed in a chamber 46 in such a way that they touch at their corresponding joining surfaces 14. A solvent atmosphere 47 is present in the chamber 46. On the one hand, the solvent atmosphere 47 smooths a surface of the partial bodies 44, in particular of the lattice structure 35. On the other hand, a positive connection is formed between the partial bodies 44 on the corresponding joining surfaces 14 that abut one another, as a result of which the assembled body 4 is produced. Due to the shape of the partial bodies 44 that is created by the boundary surfaces 45 of the cells 34, the partial bodies 44 can be positively connected.

In particular, the composite body 4 has a continuous and homogeneous lattice structure 35. Ideally, the corresponding joining surfaces 14 are no longer recognizable after the completion of the method. The solvent atmosphere 47 can be produced in the manners already described. For safety purposes, the chamber 46 is hermetically sealed, for example, during the presence of the solvent atmosphere 47. The partial bodies 44 can, for example, be placed in the chamber 46 on supports (not shown) or hung up on hooks (not shown).

The present invention is not limited to the embodiments that are illustrated and described. Modifications within the scope of the claims are just as possible as a combination of features even if these are shown and described in different embodiments.

LIST OF REFERENCE SIGNS

1 Device
2 Computing unit
3 Production device
4 Body
5 Overall model
6 Production area
7 Input interface
8 Geometrical data
9 Output interface
10 Production data
11 Storage medium
12 Production model
13 Partial model
14 Joining surface
15, 15' Connecting element
16 Sub-partial model
17 Locking element
18 Parts
19 Powder application unit
20 Irradiation unit
21 Chamber
22 Base body
23 Cut surface
24 Unit cell
25 Edges
26 Cell surface
27 Center point
28 Cut surface
29 First side of the cut surface
30 Second side of the cut surface
31 First unit cell group
32 Second unit cell group
33 Abutting surface
34 Cells
35 Lattice structure
36 Strut
37 Surface lattice structure
38 Exterior surface of the base body
39 Common struts
40 First part of the divided common strut
41 Second part of the divided common strut
42 First node
43 Second node
44 Partial body
45 Boundary surface
46 Chamber
47 Solvent atmosphere
AM External dimension
IM Internal dimension
LR Longitudinal direction
QR Transverse direction
HR Vertical direction

The invention claimed is:

1. Production method for producing a body comprising:
dividing a virtual three-dimensional overall model of a body into at least two virtual partial models by:
providing a three-dimensional virtual base body and filling the base body with a plurality of unit cells, wherein each of said unit cells comprises a plurality of edges and a cell surface defining the outer shape of the respective unit cell;
creating a virtual, cell-conforming separating surface for the overall model of the body, which has a three-dimensional cell-conforming shape that follows the contour of the unit cells;
creating the overall model of the body with a lattice structure formed from a plurality of cells wherein the unit cells are replaced by struts extending along the edges of the unit cells and representing bodies with a volume such that the cell-conforming separating surface lies within the struts; and
dividing the overall model along the cell-conforming separating surface into at least two partial models, wherein common struts of the lattice structure, which are each part of at least one cell of one partial model and part of at least one adjacent cell of the other partial model are divided in their respective longitudinal direction by means of the cell-conforming separating surface in such a way that the parts of the respective common strut each extend without gaps and continuously between two nodes of the respective corresponding cell and in such a way that the corresponding cells remain closed;
creating production data for an additive production device based on the divided, virtual, three-dimensional overall model; and
producing the body with the additive production device based on the production data.

2. Production method according to claim 1, wherein at least one of the common struts is divided in such a way that the respective parts are symmetrical or asymmetrical to one another.

3. Production method according to claim 1, further comprising:
defining at least one cut surface dividing the base body, wherein the cut surface is a flat, curved or kinked cut surface.

4. Production method according to claim 3, wherein the three-dimensional cell-conforming shape of the separating surface is determined by an algorithm or by means of the cell surface of at least some of the unit cells located in the region of the cut surface.

5. Production method according to claim 3, wherein, in order to create the three-dimensional cell-conforming shape of the separating surface, at least the unit cells located in the region of the cut surface are assigned on each of the two sides to the cut surface so that each of the two sides of the cut surface is assigned to a respective unit cell group which has a three-dimensional cell-conforming abutment surface in the region of the cut surface.

6. Production method according to claim 3, wherein the unit cells are assigned to one of the two sides of the cut surface via their center point, wherein the unit cells are assigned to the side of the cut surface on which its center point is located.

7. Production method according to claim 5, wherein the shape of the separating surface is created correspondingly or on the basis of the three-dimensional cell-conforming abutment surface of one of the respective unit cell groups.

8. Production method according to claim 1, wherein the unit cells are intersected with an outer surface of the base body to form a surface lattice structure.

9. Production method according to claim 1, further comprising:

matching at least one external dimension of the virtual three-dimensional overall model of the body with at least one corresponding internal dimension of a limited production area of an additive manufacturing device—in at least one spatial direction;

dividing the overall model into the at least two virtual three-dimensional partial models when the external dimension of the overall model exceeds the corresponding internal dimension of the production area;

forming at least one connecting element, which connects the at least two partial models to one another in such a movable manner that they move relative to one another from a production position in which corresponding joining surfaces of the partial models are spaced apart to a joining position in which the corresponding joining surfaces of the partial models abut one another; and creating a virtual three-dimensional production model in the production position of the partial models.

10. Production method according to claim 1, wherein the method steps are carried out by a user with a computing unit having a computer program stored thereon or artificial intelligence, or by such a computing unit.

11. Production method according to claim 1, wherein, based on the partial models, partial bodies are manufactured, with at least one of the partial bodies being produced in an additive production process, with the at least two partial bodies being exposed to a solvent atmosphere in a chamber, so that a surface of the partial bodies is smoothed, and that the at least two partial bodies are placed in the chamber in such a way that they are on at least one joining surface and that the solvent atmosphere thus forms an integral connection between the at least two partial bodies on the at least one joining surface.

12. Physical body, wherein the physical body is produced with a production method according to claim 1.

13. Device with a computing unit for creating a virtual three-dimensional overall model of a body, and with an additive production device for producing the body, wherein the device is designed to carry out the method steps of a production method for creating a virtual three-dimensional overall model of the body and producing the body according to claim 1.

* * * * *